United States Patent
Deel et al.

(10) Patent No.: US 7,559,035 B2
(45) Date of Patent: Jul. 7, 2009

(54) METHOD AND SYSTEM FOR NAVIGATING THROUGH A PLURALITY OF FEATURES

(75) Inventors: Darrick Deel, Allen, TX (US); Laura M. Deel, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 528 days.

(21) Appl. No.: 10/991,298

(22) Filed: Nov. 17, 2004

(65) Prior Publication Data

US 2006/0107233 A1      May 18, 2006

(51) Int. Cl.
*G06F 3/048* (2006.01)
(52) U.S. Cl. ........................ 715/810; 715/844
(58) Field of Classification Search ................. 715/844, 715/810
See application file for complete search history.

(56) References Cited

U.S. PATENT DOCUMENTS

| | | | | |
|---|---|---|---|---|
| 6,133,915 A * | 10/2000 | Arcuri et al. | ................ | 715/779 |
| 2002/0067335 A1 | 6/2002 | Millington | | |
| 2003/0112467 A1 | 6/2003 | McCollum et al. | | |
| 2004/0100504 A1* | 5/2004 | Sommer | ...................... | 345/810 |
| 2004/0183836 A1* | 9/2004 | Pagan | ......................... | 345/810 |
| 2004/0186775 A1* | 9/2004 | Margiloff et al. | ............. | 705/14 |
| 2004/0250217 A1* | 12/2004 | Tojo et al. | ................... | 715/810 |
| 2005/0091596 A1* | 4/2005 | Anthony et al. | ............. | 715/712 |
| 2005/0172239 A1* | 8/2005 | Liu et al. | ..................... | 715/763 |
| 2006/0036945 A1* | 2/2006 | Radtke et al. | ............... | 715/708 |

OTHER PUBLICATIONS

Windows XP Media Center Edition 2005, released Oct. 12, 2004, Figures 1-4, http://www.microsoft.com/windowsxp/mediacenter/default.mspx.*
Windows XP Media Center Edition 2005 Video Clip Review by CNET Senior Editor Matt Elliott☐☐http://reviews.cnet.com/windows/microsoft-windows-xp-media/4505-3672_7-31138402.html.*

* cited by examiner

*Primary Examiner*—Doug Hutton
*Assistant Examiner*—Henry Orr
(74) *Attorney, Agent, or Firm*—Trellis IP Law Group, PC (57) ABSTRACT

A method, system and apparatus are provided for navigating through a plurality of features in a user interface. A user may choose from a plurality of features made available by the user interface. The features are divided into to one or more sets. A feature may be selected by triggering a button or by using a touch screen. When a button is triggered, the associated feature is selected. The user may navigate through the features by triggering a 'more' button, which is associated with a 'more' feature. The user interface displays a first set of features. When the 'more' button is triggered, the user interface displays all the features and activates a second set of features. If the user does not trigger any button for a predefined time period, the first set is activated and is the only set that is displayed.

26 Claims, 8 Drawing Sheets

METHOD AND SYSTEM FOR NAVIGATING THROUGH A PLURALITY OF FEATURES

BACKGROUND OF THE INVENTION

1. Field of Invention

This invention relates in general to navigation through a plurality of features in a user interface. More specifically, the invention relates to methods and systems for displaying each of the plurality of features and giving a user the option of triggering a particular feature.

2. Description of the Background Art

Hardware devices using context-sensitive buttons have various applications such as ATM machines, telephones, consumer electronics, etc. In particular, a user interface associated with devices such as ATM machines and IP phones allow a user to navigate through various features of the device. The features include a call-holding facility, a call-transfer facility, a call-ending facility, etc. This navigation is performed by means of buttons. However, the number of features provided by a button is limited. Also, no flexibility is provided to change a feature associated with a button. Buttons are associated with only one particular feature. This limitation is overcome by using context-sensitive buttons.

Each context-sensitive button is associated with more than one feature. A user may navigate though the plurality of features using a 'more' button.

In a conventional user interface, a set of features is displayed at a time. When the 'more' button is pressed, the user interface activates another set of features, which can be accessed by pressing down the same set of context-sensitive buttons. In some products, the user is allowed to customize the order of the features.

However, the conventional user interface does not allow the user to view all the features offered by the user interface at the same time. Hence, the user does not know whether the user interface has a particular feature, without going through all the features.

SUMMARY OF THE EMBODIMENTS OF THE INVENTION

In one embodiment, the invention provides a method for navigating through a plurality of features in a user interface. The features are generally grouped in sets. The method comprises displaying a first set of features, activating a new set in response to a user input, and displaying the activated new set along with the first set.

In another embodiment of the invention, a method for navigating through a plurality of features is provided. The method comprises displaying a first set of features, activating a new set of features in response to a user input, displaying the activated new set along with the first set, and de-activating the activated new set if there is no user input for the activated set for a predefined time period.

In another embodiment, the invention provides a system for navigating through a plurality of features in a device. The system comprises means for activating one or more sets of features in response to a user input, and means for displaying one or more sets of features that have been activated.

In another embodiment, the invention provides a user interface for navigating through a plurality of features in a device. The user interface comprises an activator for activating at least one set of features in response to a user input, and a display unit for displaying one or more sets of features that have been activated.

In further embodiments of the present invention, an apparatus is provided for navigating through a plurality of features in a device. The apparatus comprises a processing system including a processor coupled to a display and user input device, and a machine-readable medium including instructions executable by the processor and comprising (i) one or more instructions for displaying a first set of features, (ii) one or more instructions for activating a new set of features in response to a user input, and (iii) one or more instructions for displaying the activated new set along with the first set.

These provisions, together with various ancillary provisions and features that will become apparent to those artisans who are skilled in the art, as the following description proceeds, are attained by devices, assemblies, systems, and methods of embodiments of the present invention, various embodiments thereof being shown with reference to the accompanying drawings, by way of example only, wherein:

DETAILED DESCRIPTION OF EMBODIMENTS OF THE INVENTION

The invention provides a method, system, and computer program product for navigating through a plurality of features in a user interface for devices, such as IP telephones, ATM machines, electronic musical instruments, industrial electronics, cellular telephones, HAM radios, and any other electronic device that uses context sensitive feature keys. The features vary with respect to the device. For example, an IP telephone may have features such as hold calls, transfer calls, and end call.

Figure 1:
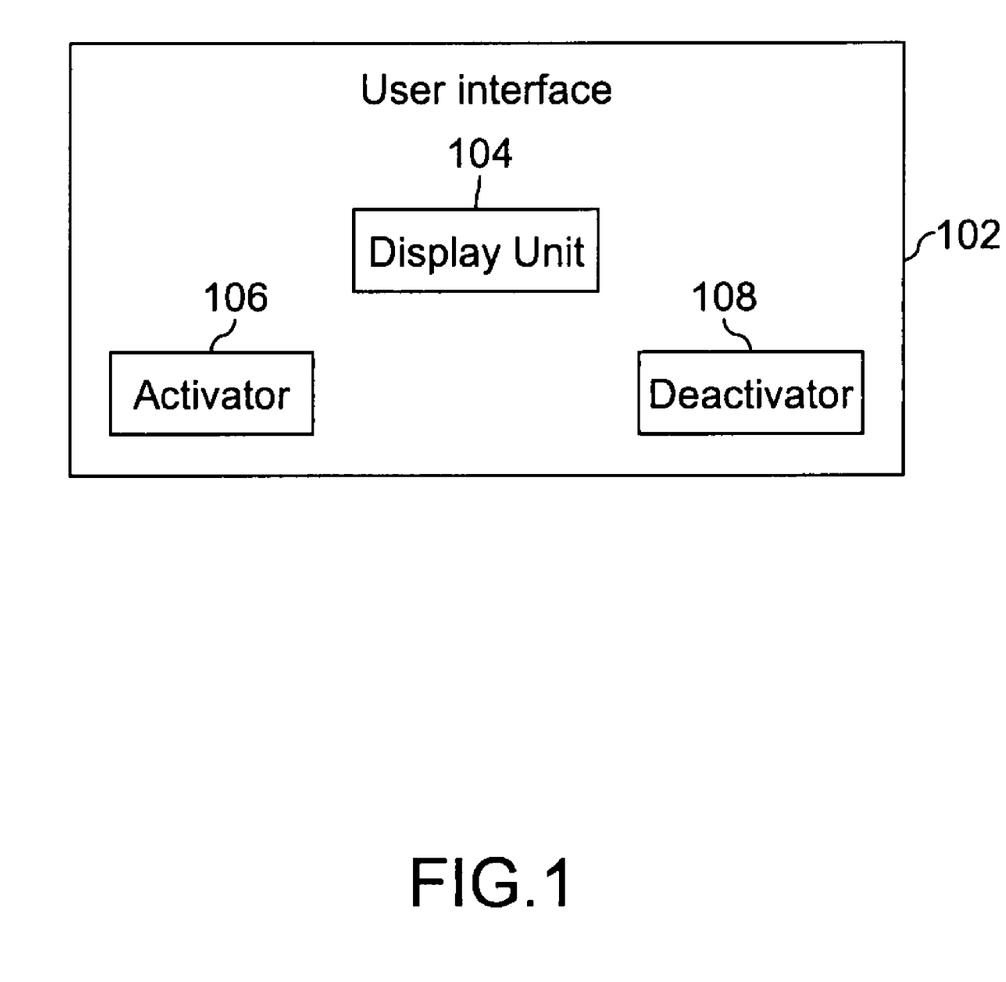
FIG. 1 illustrates a schematic diagram of a system for navigating through a plurality of features, in accordance with an exemplary embodiment of the present invention.

FIG. 1 illustrates a schematic diagram for a system 102 that enables navigating through a plurality of features associated with a device, in accordance with an exemplary embodiment of the present invention. In various embodiments, system 102 is a graphical user interface, hereinafter referred to as a user interface 102. User interface 102 includes a display unit 104, and an activator 106. In an embodiment of the invention, user interface 102 further includes a deactivator 108. Display unit 104 displays images, movies, data, and a plurality of features such as hold calls, transfer calls, end call, etc., associated with a device such as an IP telephone. Activator 106 and deactivator 108 may be a part of an operating system, an application, an embedded circuit, or any other software or apparatus. Further, the software may be in the form of a collection of separate programs, a program module with a larger program, or a portion of a program module.

Each of the plurality of features may be selected through a user input. In an embodiment of the invention, the user input may be provided by using one or more context-sensitive buttons. In an embodiment, the user selects a feature by triggering a corresponding button. In another embodiment of the invention, the user input can be provided by using a pointing device (e.g., a touch screen). For illustrative purposes, the user input is provided by using a plurality of buttons, associated with the features. In various embodiments, each of the features can be selected by pressing down the appropriate buttons. Only one set of features may be accessible through the buttons at a particular time. The set that is accessible at a particular time is hereinafter referred to as an activated set. The sets, excluding the activated set, are referred to as deactivated sets. The number of sets depends upon the number of buttons available on display unit 104. In various embodiments of the invention, a user can navigate through the deactivated sets by using a 'more' feature. The button associated with the 'more' feature is hereinafter referred to as a 'more' button.

For illustrative purposes, the features are divided into three sets. The set that is displayed as the default set by display unit 104 is hereinafter referred to as a first set. When the 'more' button is pressed, activator 106 activates the second set of features, while each of the three sets of features is displayed. When the 'more' button is pressed down again, activator 106 activates the third set and display unit 104 displays the three sets of features. In various embodiments of the invention, the sets other than the currently activated set are in a deactivated state. Further, in various embodiments of the invention, if there is no user input for a predefined time period, deactivator 108 deactivates the currently activated set, and activator 106 activates the first set. Also, display unit 104 displays only the first set of features. In one embodiment, the first set is a default set. In another embodiment, more than one set of features may be activated at the same time. The activated sets of features may be displayed by display unit 104.

Figure 2:
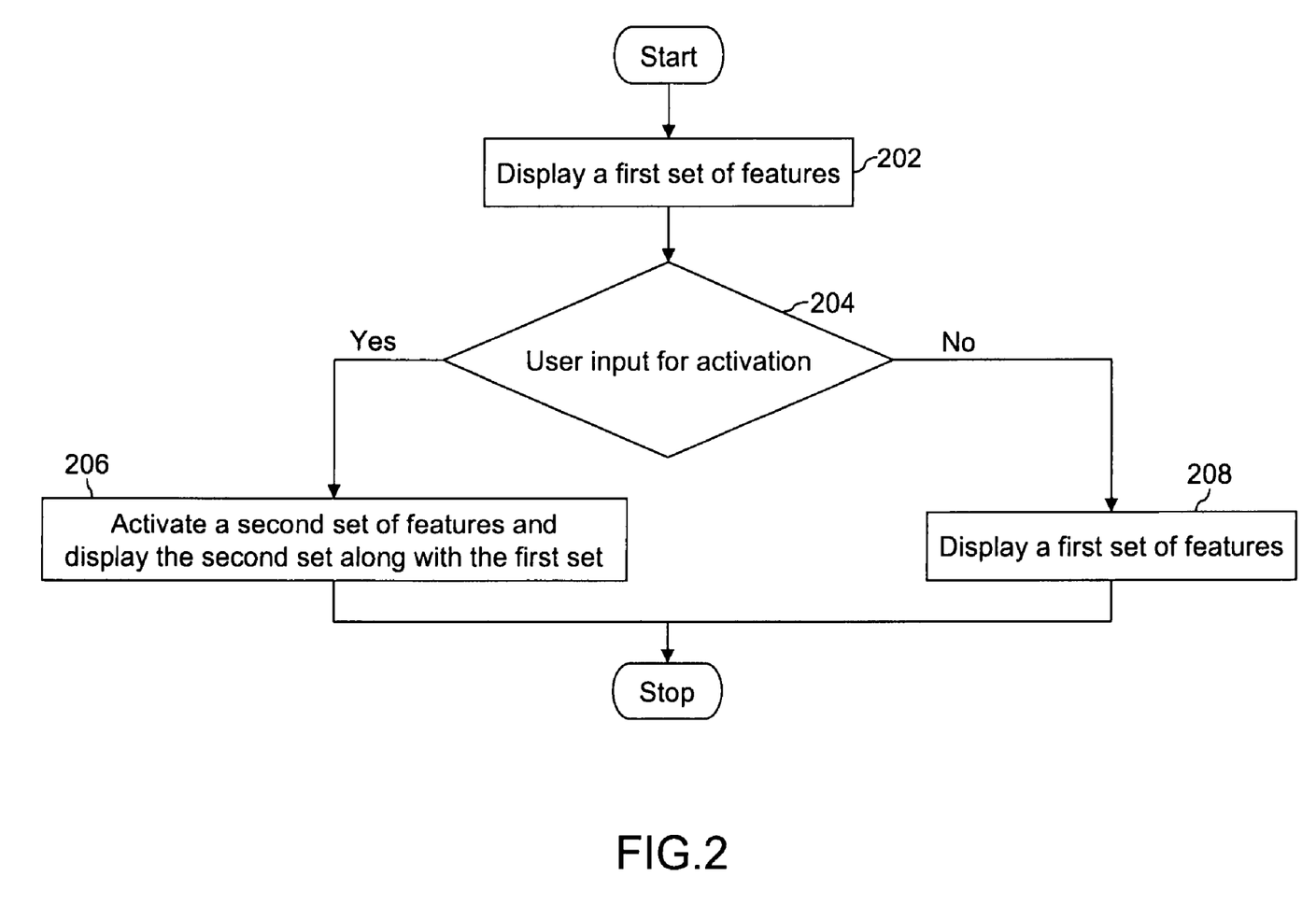
FIG. 2 illustrates a flow chart depicting a method for navigating through a plurality of features, in accordance with an exemplary embodiment of the invention.

FIG. 2 is a flow chart depicting a method for navigating through a plurality of features, in accordance with an embodiment of the invention. The features are grouped into at least one set of features. At step 202, display unit 104 shows a first set of features, which may be by default or chosen by a user. Then at step 204, if the user inputs for the activation of a second set, display unit 104 displays all of the sets and activator 106 activates the second set, as shown in step 206. Otherwise, if there is no input from the user, display unit 104 displays only the first set and activator 106 activates the first set, as shown at step 208.

Figure 3:
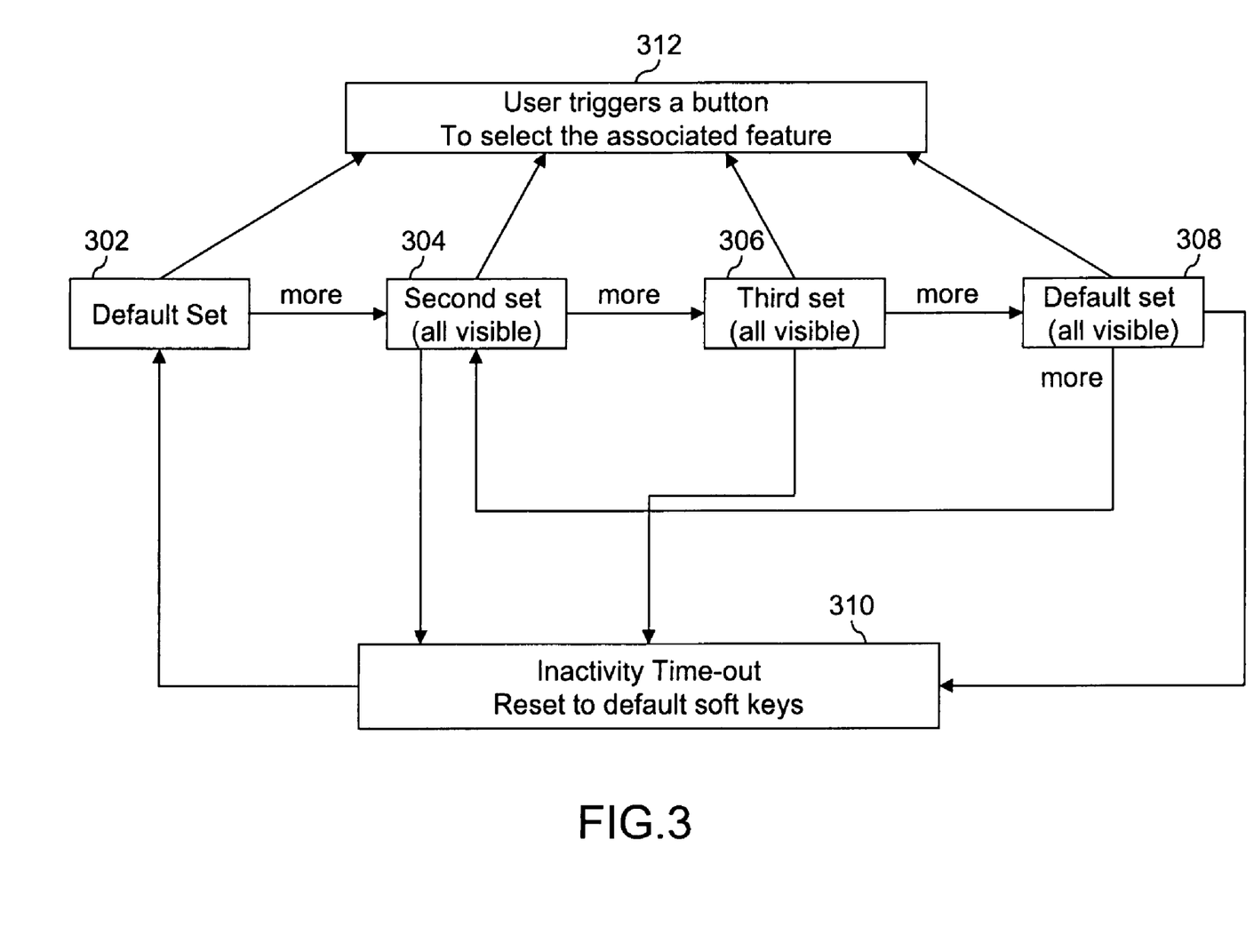
FIG. 3 illustrates a flow diagram describing the method of the present invention, in accordance with an exemplary embodiment of the invention.

FIG. 3 is a detailed flow diagram describing the method for navigating through a plurality of features, in accordance with an exemplary embodiment of the invention. The features are grouped into at least one set of features. For illustrative purposes, the features are divided into three sets. At step 302, a default set of features is displayed. As shown in step 304, if the 'more' button is triggered once, the three sets are displayed and the second set is activated. If the 'more' button is triggered once more, the three sets are displayed and the third set is activated, as shown at step 306. Then at step 308, if the 'more' button is triggered once more, the first set is activated. At any of the steps 302, 304, 306 and 308, if a user triggers a button, user interface 102 shows the appropriate display. At any of the steps 302, 304, 306 and 308, if the user does not trigger any button for a predefined time period, then only the first set is displayed, as shown at step 310. If the user triggers a button at any of the steps 302, 304, 306 and 308, the associated feature is selected at step 312.

In an embodiment of the invention, the sets of features are displayed in the form of a vertical stack. In another embodiment, the sets are displayed in the form of a horizontal stack. In various embodiments, the sets are displayed in the order of priority. For example, the currently activated set of features is at the top of the stack, while the remaining sets are in the order in which they were previously activated.

Figure 4:
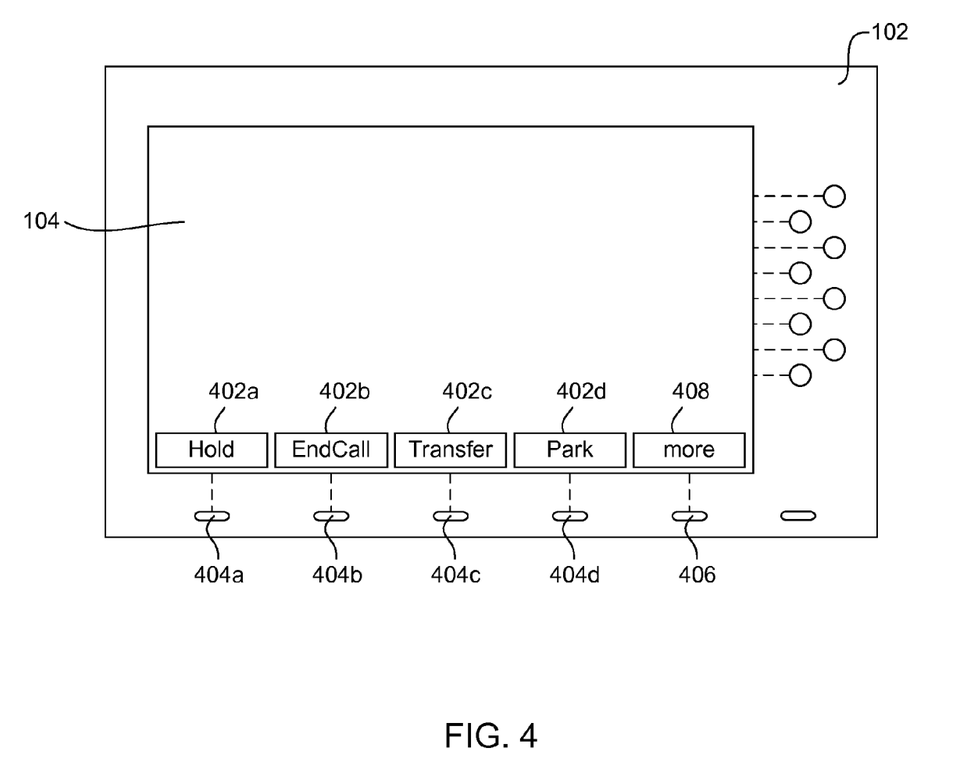
FIG. 4 depicts a user interface displaying a default set of features, in accordance with an exemplary embodiment of the invention.

FIG. 4 depicts user interface 102 when a default set of features is displayed, in accordance with an exemplary embodiment of the invention. User interface 102 comprises a plurality of features 402, a plurality of buttons 404, and display unit 104. Display unit 104 displays a first set of features. The first set of features may be taken by default or chosen by a user. Each of features 402a, 402b, 402c, and 402d may be selected by pressing down each of corresponding buttons 404a, 404b, 404c, and 404d. Hence, when a button is triggered, the associated feature is selected. For example, as displayed in FIG. 4, button 404a is associated with a 'hold' feature 402a. When the user triggers button 404a, 'hold' feature 402a is selected. When a 'more' button 406 is triggered, a 'more' feature 408 is selected.

Figure 5:
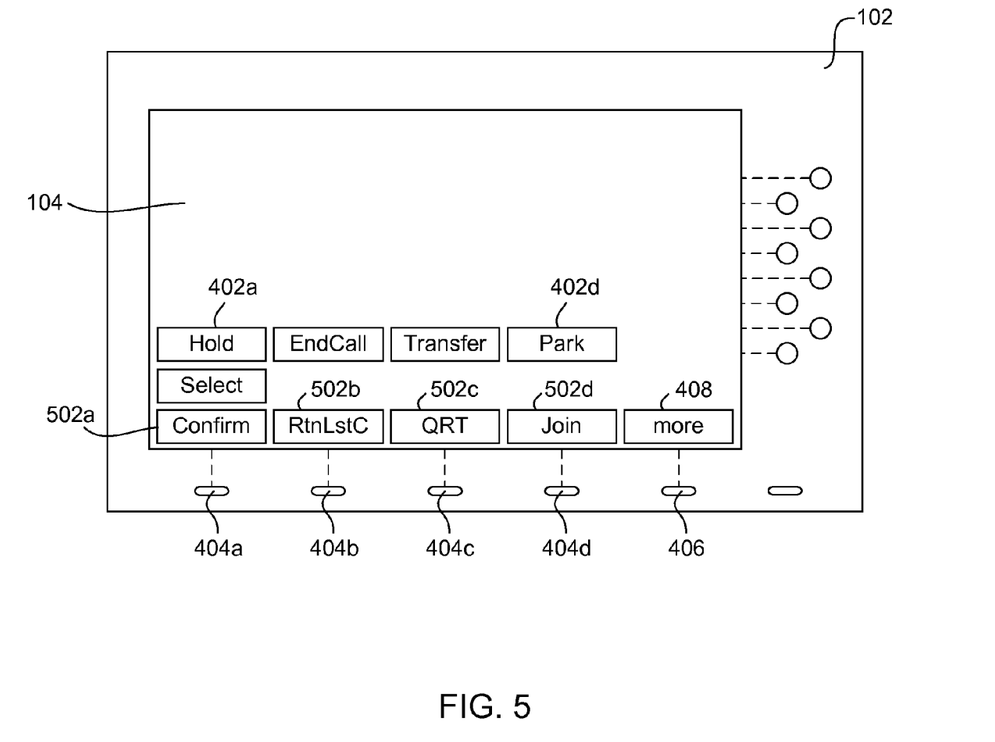
FIG. 5 depicts a user interface after the 'more' button is triggered once, in accordance with an exemplary embodiment of the invention.

FIG. 5 depicts a user interface after 'more' button 406 is triggered once, in accordance with an exemplary embodiment of the invention. When 'more' button 406 is triggered, activator 106 activates a second set of features 502 and display unit 104 displays all of the plurality of the sets of features, i.e., the first, second and third sets of features. As depicted in FIG. 5, the different sets of features are arranged in the order of priority, i.e., the currently activated set of features 502 is at the top (i.e., the highest priority) of the stack.

Figure 6:
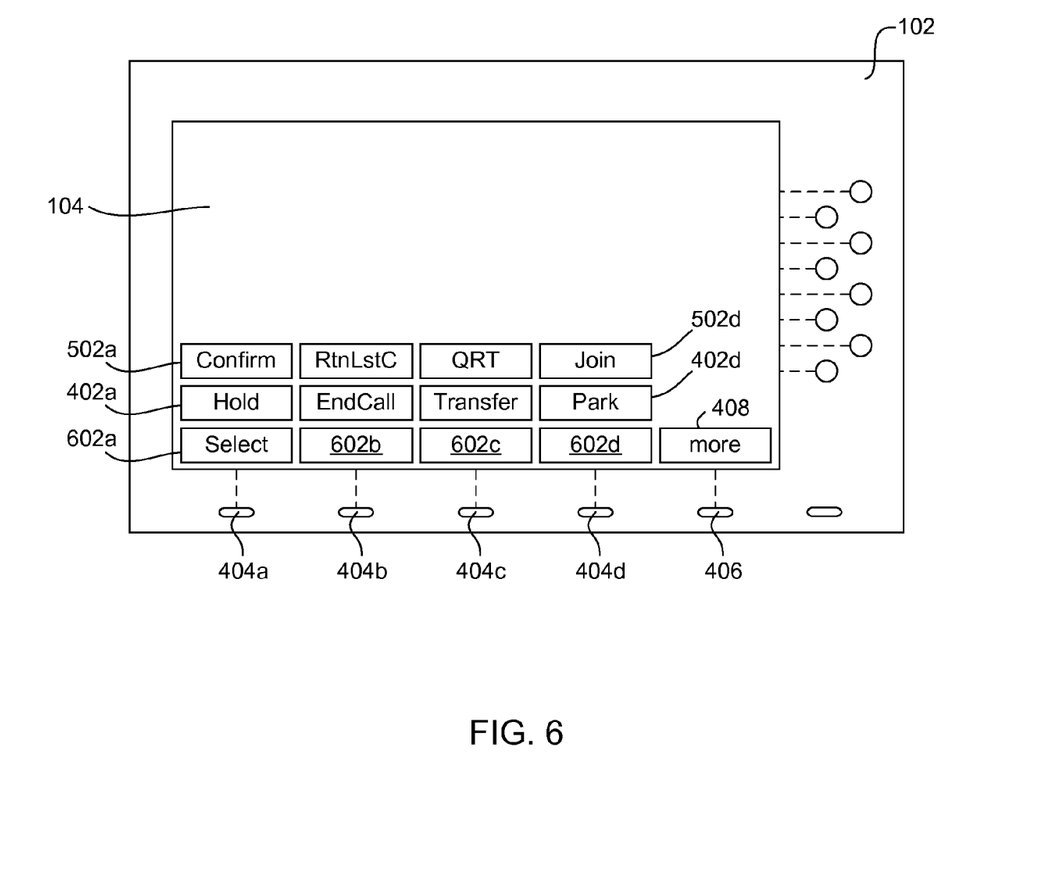
FIG. 6 depicts a user interface after the 'more' button is triggered twice, in accordance with an exemplary embodiment of the invention.

FIG. 6 depicts a user interface after 'more' button 406 is triggered twice, in accordance with an exemplary embodiment of the invention. When 'more' button 406 is triggered twice, activator 106 activates a third set of features 602 and display unit 104 displays all the sets, i.e., the first, second and third sets of features. As depicted in FIG. 6, the different sets of features are arranged in accordance with their order of priority and time of activation, i.e., the currently activated set of features 602 is at the top of the stack, followed by features 402 and features 502 which is at the bottom because it is at the last set to become active.

Figure 7:
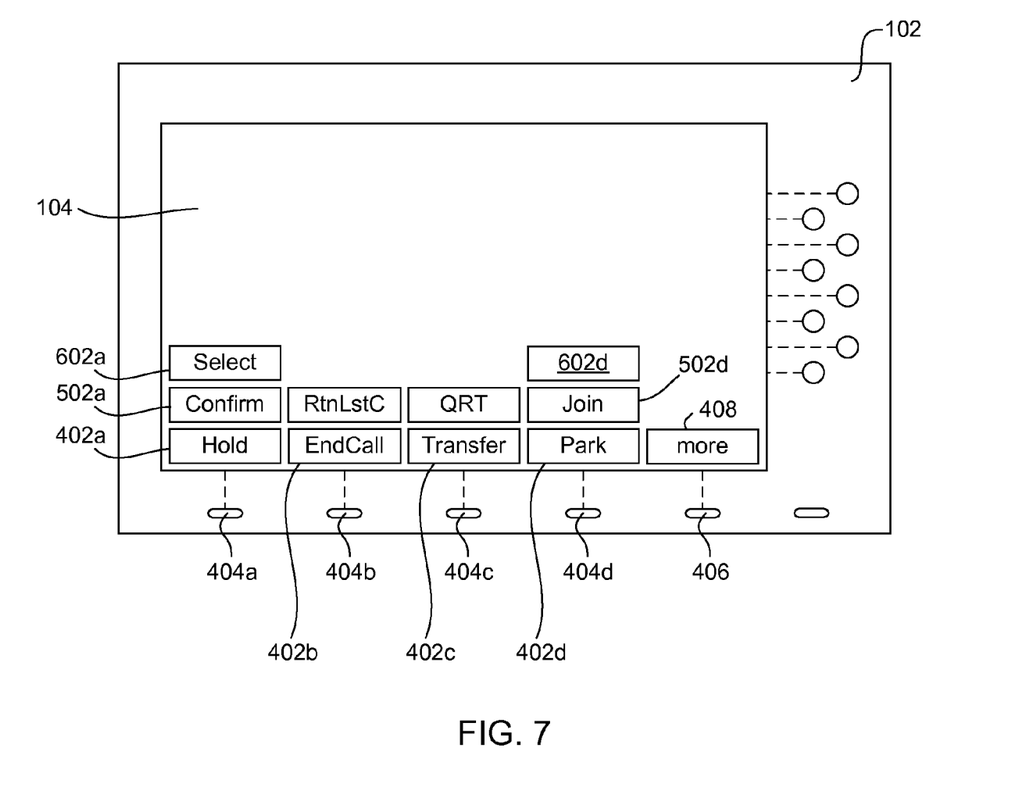
FIG. 7 depicts a user interface after the 'more' button is triggered thrice, in accordance with an exemplary embodiment of the invention.

FIG. 7 depicts user interface 102 after 'more' button 406 is triggered thrice, in accordance with an exemplary embodiment of the invention. When 'more' button 406 is triggered thrice, activator 106 activates first set of features 402 and display unit 104 displays all of the sets. 'More' button 406 remains associated with 'more' feature 408.

Figure 8:
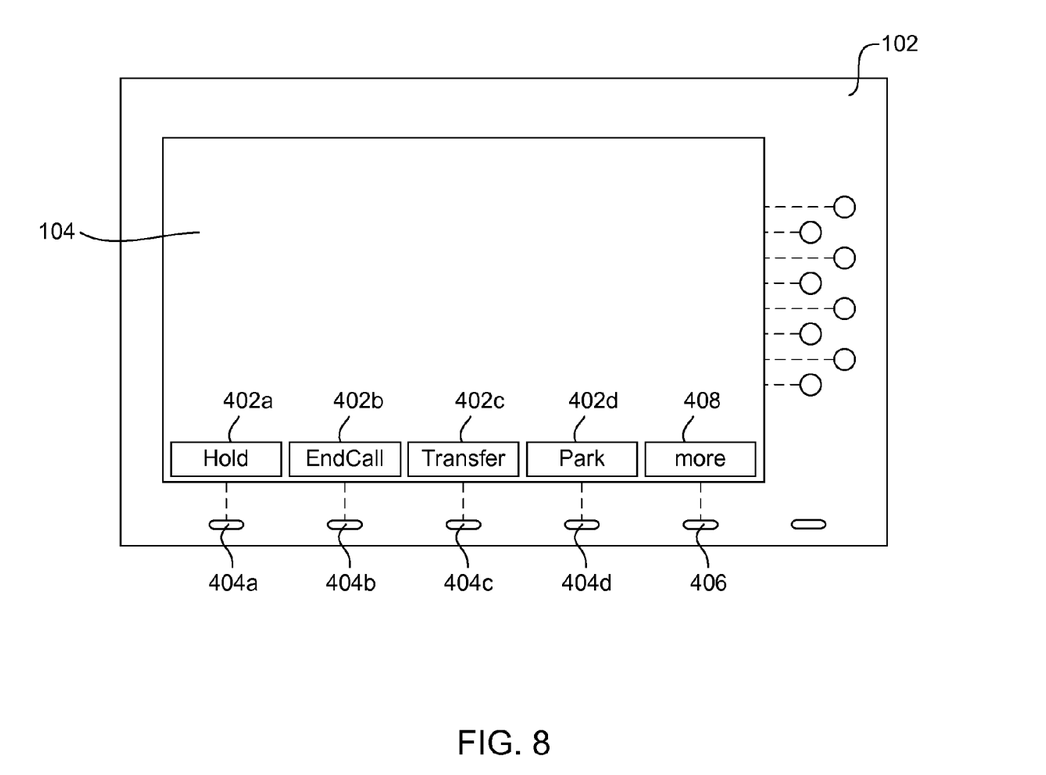
FIG. 8 depicts a user interface when no button is triggered for a predefined time period, in accordance with an exemplary embodiment of the invention.

FIG. 8 depicts user interface 102 when no button is pressed down for a predefined time period, i.e., the user does not trigger any buttons for the predefined time period, in accordance with an exemplary embodiment of the invention. If the user does not trigger any button for the predefined period of time, deactivator 108 deactivates whichever set of features is currently activated and activator 106 activates the first set. In this case, only first set of features 402 is displayed.

Embodiments of the present invention have the advantage that the user can view all the features that are available at any given time. Another advantage is that the user can easily activate features that are not immediately available.

Although the invention has been discussed with respect to specific embodiments thereof, these embodiments are merely illustrative and not restrictive of the invention.

In the description herein for embodiments of the present invention, numerous specific details are provided, such as examples of components and/or methods, to provide a thorough understanding of the embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail, to avoid obscuring aspects of the embodiments of the present invention.

Also, in the description herein for embodiments of the present invention, a portion of the disclosure recited in the specification contains material, which is subject to copyright protection. The computer program source code, object code, instructions, text or other functional information that is executable by a machine may be included in an appendix, tables, figures, or in other forms. The copyright owner has no objection to the facsimile reproduction of the specification, as filed in the Patent and Trademark Office. Otherwise all copyright rights are reserved.

A 'computer', for purposes of embodiments of the present invention, may include any processor-containing device such as a mainframe computer, a personal computer, a laptop, a notebook, a microcomputer, a server, a personal data manager, or a 'PIM' (also referred to as a personal information manager), a smart cellular or other phone, a so-called smart card, a set-top box, etc. A 'computer program' may include any suitable locally or remotely executable program or sequence of coded instructions, which are to be inserted into a computer, well known to those skilled in the art. Stated more specifically, a computer program includes an organized list of instructions that, when executed, cause the computer to behave in a predetermined manner. A computer program contains a list of ingredients (called variables) and a list of directions (called statements) that tell the computer what to do with the variables. The variables may represent numeric data, text, audio or graphical images. If a computer were employed to synchronously present multiple video program ID streams, such as on the display screen of the computer, it would have suitable instructions (e.g., source code) for allowing a user to synchronously display multiple video program ID streams, in accordance with embodiments of the present invention. Similarly, if a computer is employed for presenting other media via a suitable directly or indirectly coupled input/output (I/O) device, the computer would have suitable instructions for allowing a user to input or output (e.g., the present invention) the program code and/or data information, respectively, in accordance with the embodiments of the present invention.

A 'computer-readable medium', for purposes of embodiments of the present invention, may be any medium that can contain, store, communicate, propagate, or transport the computer program for use by or in connection with the instruction execution system apparatus, system or device. The computer-readable medium can be, by way of example only but not by limitation, an electronic, magnetic, optical, electromagnetic, infrared, or semiconductor system, apparatus, system, device, propagation medium, or computer memory. The computer-readable medium may have suitable instructions for synchronously presenting multiple video program ID streams, such as on a display screen, or for providing input or presenting, in accordance with various embodiments of the present invention.

Reference throughout this specification to "one embodiment", "an embodiment", or "a specific embodiment" means that a particular feature, structure or characteristic described in connection with the embodiment is included in at least one embodiment of the present invention and not necessarily in all embodiments. Therefore, the appearance of the phrases "in one embodiment", "in an embodiment", or "in a specific embodiment" in various places throughout this specification are not necessarily referring to the same embodiment. Furthermore, the particular features, structures or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

Further, at least some of the components of an embodiment of the invention may be implemented by using a programmed general-purpose digital computer, by means of application-specific integrated circuits, programmable logic devices or field-programmable gate arrays, or by using a network of interconnected components and circuits. Connections may be wired, wireless, by modem, and so forth.

It will also be appreciated that one or more of the elements depicted in the drawings/figures can also be implemented in a more separated or integrated manner, or even removed or rendered inoperable in certain cases, as is useful, in accordance with a particular application.

Additionally, any signal arrows in the drawings/figures should be considered only as exemplary, and not limiting, unless otherwise specifically noted. Combinations of components or steps will also be considered as being noted, where the terminology renders the ability to separate or combine as unclear.

As used in the description herein and throughout the claims that follow, 'a', 'an', and 'the' includes plural references unless the context clearly dictates otherwise. Also, as used in the description herein and throughout the claims that follow, the meaning of 'in' includes 'in' as well as 'on', unless the context clearly dictates otherwise.

The foregoing description of the illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention, and are to be included within the spirit and scope of the present invention.

Therefore, while the present invention has been described herein with reference to particular embodiments thereof, latitude of modification, and various changes and substitutions are intended in the foregoing disclosures. It will be appreciated that in some instances some features of the embodiments of the invention will be employed without the corresponding use of other features, without departing from the scope and spirit of the invention, as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention. The invention will include any and all embodiments and equivalents falling within the scope of the appended claims.

What is claimed is:

1. A method for navigating through a plurality of features in a user interface, the method comprising:
   grouping the plurality of features into first and second sets of features, wherein each of the first and second sets of features comprises more than one feature from the plurality of features;
   displaying the first set of features in a plurality of first locations designated to allow for feature activation and selection on the user interface;
   activating the second set of features in response to a first user input selection;
   deactivating the first set of features in response to the first user input selection;
   displaying the activated second set of features in the plurality of first locations previously occupied by the first set of features in response to the first user input selection; and
   displaying the deactivated first set of features in a plurality of second locations designated to disallow feature activation and selection on the user interface, the displaying the deactivated first set of features being in response to the first user input selection, wherein each of the plurality of features in the first and second sets of features is unobstructed and simultaneously visible on the user interface in response to the first user input selection, and each feature in the activated second set of features is selectable by a second user input selection.

2. The method of claim 1, wherein the first and second sets of features are stacked in an order of activation.

3. The method of claim 2, wherein the ordered stack comprises a vertical stack.

4. The method of claim 2, wherein the ordered stack comprises a horizontal stack.

5. The method of claim 1, wherein the method further comprises deactivating the activated second set of features when there is no second user input selection for the activated second set of features for a predefined time period.

6. The method of claim 1, wherein the second user input selection is given using a context-sensitive button.

7. The method of claim 6, further comprising changing an association of the context-sensitive button from the deactivated first set of features to the activated second set of features in response to the first user input selection.

8. The method of claim 1, wherein the second user input selection is given using a pointing device.

9. The method of claim 8, wherein the pointing device comprises a touch screen.

10. method of claim 1, wherein the deactivated first set of features is not selectable by the second user input selection.

11. The method of claim 1, wherein the second set of features are not displayed prior to the activating of the second set of features in response to the first user input selection.

12. An apparatus configured for navigating through a plurality of features via a user interface, the apparatus comprising:
   one or more processors; and
   logic encoded in one or more tangible media for execution by the one or more processors, and when executed operable to:
      group the plurality of features into first and second sets of features, wherein each of the first and second sets of features comprises more than one feature from the plurality of features;
      display the first set of features in a plurality of first locations designated to allow for feature activation and selection on the user interface;
      activate the second set of features in response to a first user input selection;
      deactivate the first set of features in response to the first user input selection;
      display the activated second set of features in the plurality of first locations previously occupied by the first set of features in response to the first user input selection;
      display the deactivated first set of features in a plurality of second locations designated to disallow feature activation and selection on the user interface, the display of the deactivated first set of features being in response to the first user input selection, wherein each of the plurality of features in the first and second sets of features is unobstructed and simultaneously visible on the user interface in response to the first user input selection, and each feature in the activated second set of features is selectable by a second user input selection; and
      deactivate the activated second set of features when there is no second user input selection for the activated second set of features for a predefined time period.

13. The apparatus of claim 12, wherein the first and second sets of features are stacked in an order of activation.

14. The apparatus of claim 13, wherein the ordered stack comprises a vertical stack.

15. The apparatus of claim 13, wherein the ordered stack comprises a horizontal stack.

16. The apparatus of claim 12, wherein the second user input selection is given using a context-sensitive button.

17. The apparatus of claim 12, wherein the second user input selection is given using a pointing device.

18. The apparatus of claim 17, wherein the pointing device comprises a touch screen.

19. A system for feature navigation, the system comprising:
   a device having a display unit for displaying a plurality of features;
   means for grouping the plurality of features into first and second sets of features, wherein each of the first and second sets of features comprises more than one feature from the plurality of features;
   means for displaying the first set of features in a plurality of first locations designated to allow for feature activation and selection on the display unit of the device, the first set of features being a default set of features;
   means for activating the second set of features in response to a first user input selection;
   means for deactivating the first set of features in response to the first user input selection;
   means for displaying on the display unit the deactivated first set of features in a plurality of second locations designated to disallow feature activation and selection, the displaying of the deactivated first set of features being in response to the first user input selection; and
   means for displaying on the display unit the activated second set of features in the plurality of first locations previously occupied by the first set of features in response to the first user input selection, such that each of the plurality of features in the deactivated first set of features and the activated second set of features is unobstructed and simultaneously visible on the display unit in response to the first user input selection, and each feature in the activated second set of features is selectable by a second user input selection.

20. The system of claim 19, further comprising means for deactivating at least one of the activated one or more sets of features when there is no second user input selection for a predefined time period.

21. The system of claim 19, wherein the second user input selection is given using a context-sensitive button.

22. The system of claim 19, wherein the second user input selection is given using a touch screen.

23. A user interface for navigating through a plurality of features in a device, the user interface comprising:
   an embedded circuit having an activator and a deactivator, the activator being for activating a first set of features in response to a first user input selection, the deactivator being for deactivating a second set of features in response to the first user input selection, wherein the plurality of features are grouped into the first and second sets of features, wherein each of the first and second sets of features comprises more than one feature from the plurality of features; and
   a display unit on the device for displaying the deactivated second set of features in a plurality of first locations designated to disallow feature activation and selection, and the activated first set of features in a plurality of second locations designated for feature activation and selection, such that each of the plurality of features in the deactivated second set of features and the activated first set of features is unobstructed and simultaneously visible on the display unit, and each feature in the activated first set of features is selectable by a second user input selection, the displaying of the second set of features and the displaying of the activated first set of features both being in response to the first user input selection.

24. The user interface of claim 23, wherein the deactivator is further for deactivating at least one of the activated one or more sets of features when there is no second user input selection for a predefined time period.

25. An apparatus for navigating through a plurality of features in a device, the apparatus comprising:
   a processing system including a processor coupled to a display unit and a user input device;
   a computer-readable storage device including instructions executable by the processor comprising:
      one or more instructions for grouping the plurality of features into first and second sets of features, wherein each of the first and second sets of features comprises more than one feature from the plurality of features;
      one or more instructions for displaying the first set of features in a plurality of first locations designated to allow for feature activation and selection on the display unit;
      one or more instructions for activating the second set of features in response to a first user input selection;
      one or more instructions for deactivating the first set of features in response to the first user input selection;
      one or more instructions for displaying the activated second set of features in the plurality of first locations previously occupied by the first set of features in response to the first user input selection; and
      one or more instructions for displaying the deactivated first set of features in a plurality of second locations designated to disallow feature activation and selection on the display unit, the displaying the deactivated first set of features being in response to the first user input selection, wherein each of the plurality of features in the first and second sets of features is unobstructed and simultaneously visible on the display unit in response to the first user input selection, and each feature in the activated second set of features is selectable by a second user input selection.

26. A computer-readable storage device including instructions executable by a processor, the storage device comprising:
   one or more instructions for grouping a plurality of features into first and second sets of features, wherein each of the first and second sets of features comprises more than one feature from the plurality of features;
   one or more instructions for displaying the first set of features in a plurality of first locations designated to allow for feature activation and selection on a user interface;
   one or more instructions for activating the second set of features in response to a first user input selection;
   one or more instructions for deactivating the first set of features in response to the first user input selection;
   one or more instructions for displaying the activated second set of features in the plurality of first locations previously occupied by the first set of features in response to the first user input selection; and
   one or more instructions for displaying the deactivated first set of features in a plurality of second locations designated to disallow feature activation and selection on the user interface, the displaying the deactivated first set of features being in response to the first user input selection, wherein each of the plurality of features in the first and second sets of features is unobstructed and simultaneously visible on the user interface in response to the first user input selection, and each feature in the activated second set of features is selectable by a second user input selection.

* * * * *